United States Patent
Otagaki et al.

(10) Patent No.: US 8,618,818 B2
(45) Date of Patent: Dec. 31, 2013

(54) ELECTROSTATIC CAPACITY TYPE TOUCH SENSOR

(75) Inventors: Takayasu Otagaki, Hashima (JP); Atsuhiro Ichikawa, Mizuho (JP); Hiroya Ito, Ichinomiya (JP); Kazuhiro Hasegawa, Ichinomiya (JP)

(73) Assignee: On Semiconductor Trading, Ltd., Hamilton (BM)

( * ) Notice: Subject to any disclaimer, the term of this patent is extended or adjusted under 35 U.S.C. 154(b) by 387 days.

(21) Appl. No.: 13/029,701

(22) Filed: Feb. 17, 2011

(65) Prior Publication Data
US 2011/0199105 A1    Aug. 18, 2011

(30) Foreign Application Priority Data
Feb. 18, 2010   (JP) ................................ 2010-033725

(51) Int. Cl.
*G01R 27/26* (2006.01)
(52) U.S. Cl.
USPC ......................................... 324/679; 345/173
(58) Field of Classification Search
USPC ................................ 324/667, 674
See application file for complete search history.

(56) References Cited

U.S. PATENT DOCUMENTS

2007/0268272 A1*  11/2007  Perski et al. .................. 345/173

FOREIGN PATENT DOCUMENTS

JP    2005-190950    7/2005

* cited by examiner

*Primary Examiner* — Arleen M Vazquez
*Assistant Examiner* — Feba Pothen
(74) *Attorney, Agent, or Firm* — McDermott Will & Emery LLP

(57) ABSTRACT

This invention offers an electrostatic capacity type touch sensor that can be calibrated in a short period of time at a moment when a finger of operator or the like does not touch a touch pad. An absolute value of a difference (AD0−AD2) between a first output voltage AD0 and a third output voltage AD2 is compared with a first threshold value Vtr1 in step S10. When the difference (AD0−AD2) between the output voltages is smaller than the first threshold value Vtr1, it is judged that the finger of operator or the like does not touch the touch pad, and it is judged which of an offset in a second output voltage AD1 and an offset in the third output voltage AD2 is smaller than the other. When the offset in the second output voltage AD1 is smaller than the offset in the third output voltage AD2, the modification to the second calibration data X1 is permitted.

5 Claims, 9 Drawing Sheets

CHARGE ACCUMULATION MODE

CHARGE TRANSFER MODE

US 8,618,818 B2

ELECTROSTATIC CAPACITY TYPE TOUCH SENSOR

CROSS-REFERENCE OF THE INVENTION

This application claims priority from Japanese Patent Application No. 2010-33725, the content of which is incorporated herein by reference in its entirety.

BACKGROUND OF THE INVENTION

1. Field of the Invention

This invention relates to an electrostatic capacity type touch sensor.

2. Description of the Related Art

The electrostatic capacity type touch sensor has been known as a data input device to various kinds of electronic devices such as a mobile phone, a portable audio device, a portable game console, a television and a personal computer.

The electrostatic capacity type touch sensor detects a touch by detecting a change in a capacitance of a capacitor associated with a touch pad induced by touching or approaching the touch pad with a finger of an operator or a pen tip (hereafter referred to as the finger of operator or the like).

Since an output value of the electrostatic capacity type touch sensor varies sensitively to its environment (temperature, humidity, electric field from its surrounding environment or the like), an offset adjustment to an input or an output of the sensor, which is referred to as calibration, is required in general.

Further information on the electrostatic capacity type touch sensor is disclosed in Japanese Patent Application Publication No. 2005-190950, for example.

It is preferable that the calibration is performed while the finger of operator or the like does not touch the touch pad. It is also preferable that the calibration is performed whenever the environment has changed even slightly.

However, while the change in the environment, to which the electrostatic capacity type touch sensor is vulnerable, occurs frequently in daily usage, the calibration take considerable amount of time. In addition, if the finger of operator or the like touches during the calibration, the situation is reflected in the calibration to make it wrong calibration.

Thus, this invention is directed to offer an electrostatic capacity type touch sensor that can be calibrated in a short period of time at a moment when the finger of operator or the like does not touch the touch pad.

SUMMARY OF THE INVENTION

This invention provides an electrostatic capacity type touch sensor having a sensor circuit detecting a change in a capacitance of a touch pad, a calibration register to adjust an offset in an output value of the sensor circuit, and a control circuit that makes the sensor circuit operate to obtain a first output value of the electrostatic capacity type touch sensor based on calibration data stored in the calibration register, modifies the calibration data depending on the first output value, makes the sensor circuit operate to obtain a second output value of the electrostatic capacity type touch sensor based on the modified calibration data, makes the sensor circuit operate to obtain a third output value of the electrostatic capacity type touch sensor based on the calibration data before the modification, and judges whether an offset in the second output value is larger than an offset in the third output value when a difference between the first output value and the third output value is smaller than a first threshold value.

DETAILED DESCRIPTION OF THE INVENTION

Figure 1:
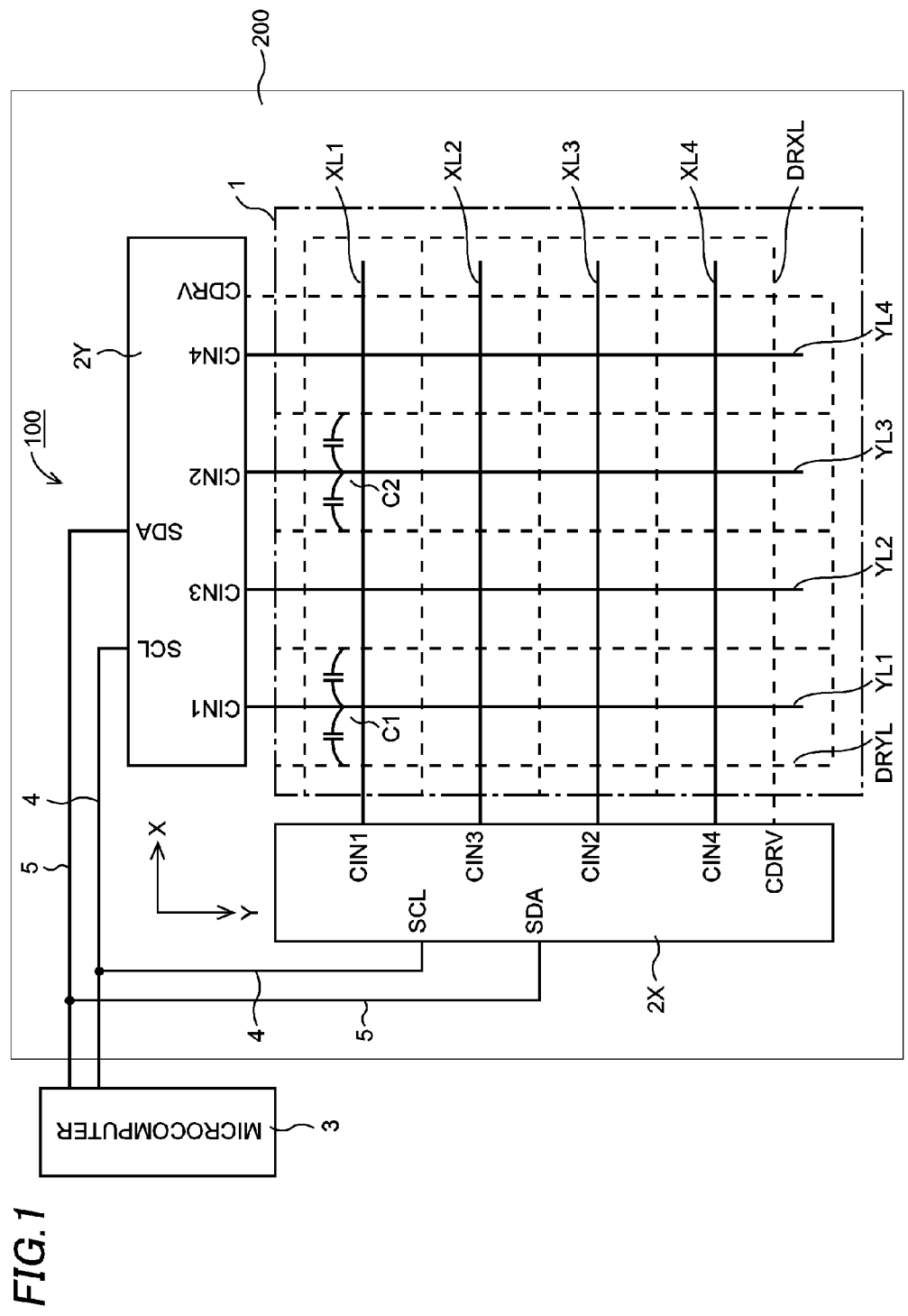
FIG. 1 shows a structure of an electrostatic capacity type touch sensor according to an embodiment of this invention.

An electrostatic capacity type touch sensor according to an embodiment of this invention is described referring to the drawings. The electrostatic capacity type touch sensor is formed to include a touch panel and a signal processing circuit. An example of an overall structure of the electrostatic capacity type touch sensor will be described first, and then proceedings of calibration control, which make features of this invention, will be described.

An electrostatic capacity type touch sensor 100 is formed to include a touch panel 1, signal processing circuits 2X and 2Y and a microcomputer 3, as shown in FIG. 1.

The touch panel 1 has X sense lines XL1-XL4 (an example of "touch pads" of this invention) and an X drive line DRXL extending in an X direction on a glass substrate 200. The X drive line DRXL is disposed on both sides of each of the X sense lines XL1-XL4. The touch panel 1 also has Y sense lines YL1-YL4 (an example of "touch pads" of this invention) and a Y drive line DRYL extending in a Y direction on the glass substrate 200 and intersecting the X sense lines XL1-XL4. The Y drive line DRYL is disposed on both sides of each of the Y sense lines YL1-YL4. The X sense lines XL1-XL4, the X drive line DRXL, the Y sense lines YL1-YL4 and the Y drive line DRYL are electrically insulated from each other with a dielectric layer or the like.

The signal processing circuits 2X and 2Y are disposed adjacent the touch panel 1 on the glass substrate 200. The signal processing circuit 2X has first through fourth input terminals CIN1-CIN4 and a drive terminal CDRV outputting an alternating current drive signal SCDRV (amplitude voltage Vref). The first input terminal CIN1 is connected to the X sense line XL1, the second input terminal CIN2 is connected to the X sense line XL3, the third input terminal CIN3 is connected to the X sense line XL2 and the fourth input terminal CIN4 is connected to the X sense line XL4. The drive terminal CDRV is connected to the X drive line DRXL.

Similarly, the signal processing circuit 2Y has first through fourth input terminals CIN1-CIN4 and a drive terminal CDRV outputting an alternating current drive signal SCDRV (amplitude voltage Vref). The first input terminal CIN1 is connected to the Y sense line YL1, the second input terminal CIN2 is connected to the Y sense line YL3, the third input terminal CIN3 is connected to the Y sense line YL2, and the fourth input terminal CIN4 is connected to the Y sense line YL4. The drive terminal CDRV is connected to the Y drive line DRYL.

In addition, each of the signal processing circuits 2X and 2Y has a serial clock terminal SCL and a serial data terminal SDA. Both of the serial clock terminals SCL are connected to a serial clock line 4, while both of the serial data terminals SDA are connected to a serial data line 5. In this case, the serial clock line 4 and the serial data line 5 constitute an $I^2C$ (Inter-Integrated Circuit) bus.

A microcomputer 3, that is a master device, is provided on a PCB substrate (not shown) outside the glass substrate 200. The serial clock line 4 and the serial data line 5 are connected to the microcomputer 3 through an FPC (Flexible Printed Circuit) or the like. With the structure described above, it is made possible that data communication is performed between the microcomputer 3 and the signal processing circuits 2X and 2Y.

The calibration control, which makes the features of this invention, can be carried out by executing a program stored in the microcomputer 3.

Figure 2:
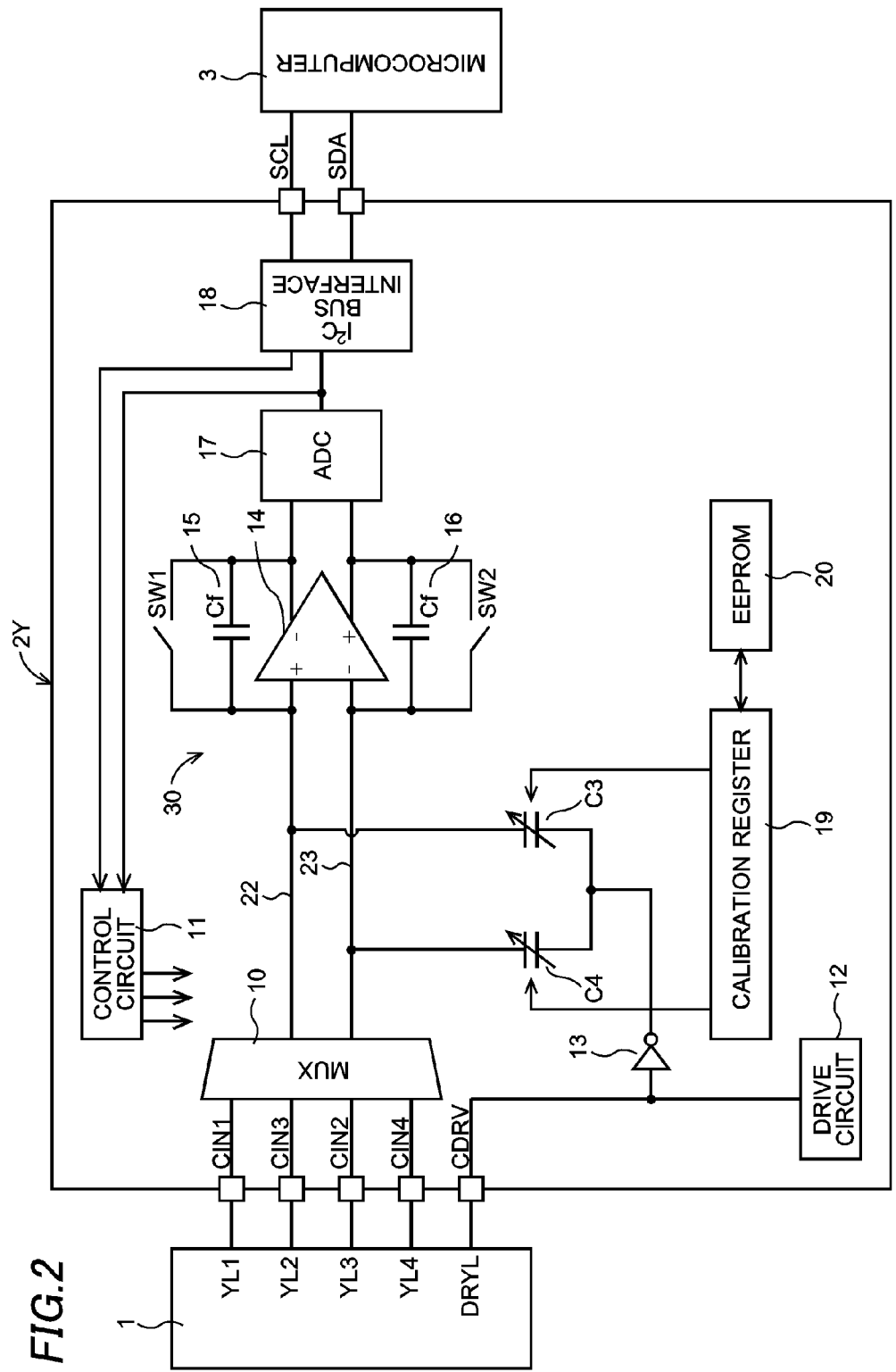
FIG. 2 shows a structure of a signal processing circuit of the electrostatic capacity type touch sensor according to the embodiment of this invention.

A detailed structure of each of the signal processing circuits 2X and 2Y in the electrostatic capacity type touch sensor is hereafter described referring to FIG. 2. Since the structure of the signal processing circuit 2X is identical to the structure of the signal processing circuit 2Y, it is sufficient to describe only the structure of the signal processing circuit 2Y.

As shown in FIG. 2, the signal processing circuit 2Y is formed to include a selection circuit 10, a control circuit 11, a drive circuit 12 that generates the alternating current drive signal SCDRV, an inverter 13, a third electrostatic capacitor C3, a fourth electrostatic capacitor C4, a differential amplifier 14, a first feedback capacitor (Cf) 15, a second feedback capacitor (Cf) 16, an AD converter 17, an $I^2C$ bus interface circuit 18, a calibration register 19 and an EEPROM 20. The control circuit 11 controls overall operations (including the calibration control) of the signal processing circuit 2Y based on commands from the microcomputer 3.

The selection circuit 10 has a first phase and a second phase. In the first phase, it selects signals from the first input terminal CIN1 and the second input terminal CIN2. That is, the first input terminal CIN1 is connected to a non-inverting input terminal (+) of the differential amplifier 14 through a wiring 22, and the second input terminal CIN2 is connected to an inverting input terminal (−) of the differential amplifier 14 through a wiring 23.

The selection circuit 10 selects signals from the third input terminal CIN3 and the fourth input terminal CIN4 in the second phase. That is, the third input terminal CIN3 is connected to the non-inverting input terminal (+) of the differential amplifier 14 through the wiring 22, and the fourth input terminal CIN4 is connected to the inverting input terminal (−) of the differential amplifier 14 through the wiring 23.

One end of the third electrostatic capacitor C3 is connected to the wiring 22, while one end of the fourth electrostatic capacitor C4 is connected to the wiring 23. Another end of the third electrostatic capacitor C3 and another end of the fourth electrostatic capacitor C4 are connected together and applied an inverted alternating current drive signal *SCDRV, that is generated by inverting the alternating current drive signal SCDRV from the drive circuit 12 with the inverter 13.

Figure 3:
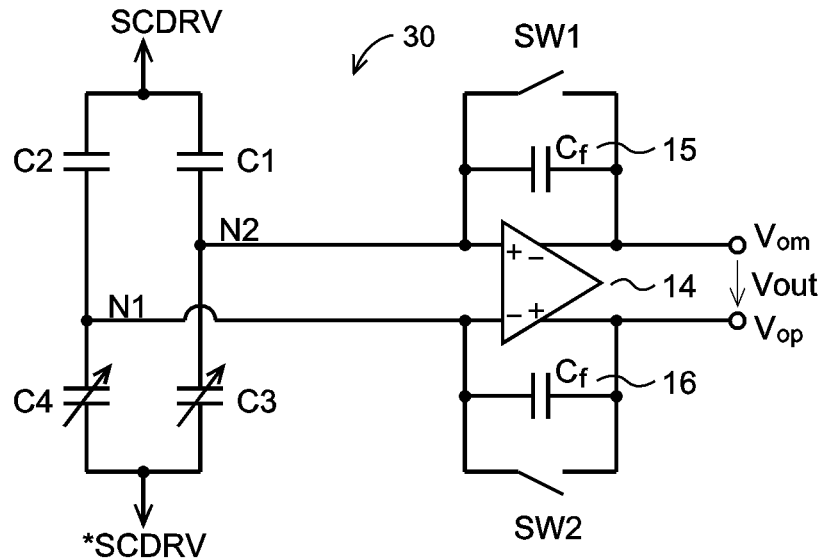
FIG. 3 shows a structure of a sensor circuit.

As a result, there is formed a sensor circuit 30 of a differential input type, as shown in FIG. 3. FIG. 3 shows a case of the first phase in which the selection circuit 10 selects the signals from the first input terminal CIN1 and the second input terminal CIN2. In this case, a first electrostatic capacitor C1 is formed between the Y sense line YL1 connected to the first input terminal CIN1 and the Y drive line DRYL, while a second electrostatic capacitor C2 is formed between the Y sense line YL3 connected to the second input terminal CIN2 and the Y drive line DRYL, as shown in FIG. 1.

Then, the first electrostatic capacitor C1 is connected in series with the third electrostatic capacitor C3, while the second electrostatic capacitor C2 is connected in series with the fourth electrostatic capacitor C4, as shown in FIG. 3. The alternating current drive signal SCDRV from the drive circuit 12 is applied to a connecting node between the first electrostatic capacitor C1 and the second electrostatic capacitor C2, which is the Y drive line DRYL.

A connecting node N2 between the first electrostatic capacitor C1 and the third electrostatic capacitor C3 is connected to the non-inverting input terminal (+) of the differential amplifier 14. A connecting node N1 between the second electrostatic capacitor C2 and the fourth electrostatic capacitor C4 is connected to the inverting input terminal (−) of the differential amplifier 14.

The first feedback capacitor 15 and a switch SW1 are connected between an inverting output terminal (−) and the non-inverting input terminal (+) of the differential amplifier 14, while the second feedback capacitor 16 and a switch SW2 are connected between a non-inverting output terminal (+) and the inverting input terminal (−) of the differential amplifier 14. It is preferable that the first and second feedback capacitors 15 and 16 have the same capacitance CAf.

The sensor circuit 30 of the differential input type outputs an output voltage Vout that corresponds to a difference between a capacitance CA1 of the first electrostatic capacitor C1 and a capacitance CA2 of the second electrostatic capacitor C2. Its detailed operations are to be described.

Since the output voltage Vout of the sensor circuit 30 is an analog signal, it can be not digitally processed as it is. Thus, the output voltage Vout is converted into a digital signal with the AD converter 17. An output of the AD converter 17 is converted into serial data in a predetermined format by the $I^2C$ bus interface circuit 18, and transmitted to the microcomputer 3 through the serial clock terminal SCL and the serial data terminal SDA. The microcomputer 3 processes the serial data it received, and determines a touch position on the touch panel 1.

The commands from the microcomputer 3 are transmitted to the control circuit 11 through the $I^2C$ bus interface circuit 18. The control circuit 11 controls overall operations (including the calibration control) of the signal processing circuit 2Y based on the commands it received.

The proceedings of the calibration of the sensor circuit 30 described above are explained referring to FIGS. 2, 3 and 4. An offset is caused in the output voltage Vout of the sensor circuit 30 when there is an imbalance between the capacitance CA1 of the first electrostatic capacitor C1 and the capacitance CA2 of the second electrostatic capacitor C2, that is, when there is a difference between the capacitances, in an initial state (a state in which the finger of operator or the like is too far away from the touch panel 1 to be detected).

In this case, the offset in the output voltage Vout means a deviation voltage from 0 V that is a center value of the output voltage Vout. When the offset is caused in the output voltage Vout, detection accuracy of the touch sensor is degraded.

In addition, since the output voltage Vout varies sensitively to its environment (temperature, humidity, electric field from its surrounding environment or the like) as described above, an offset adjustment corresponding to a change in the environment is required.

Thus, the third and fourth electrostatic capacitors C3 and C4 are formed of variable capacitors so that the offset in the output voltage Vout can be adjusted. That is, a capacitance CA3 of the third electrostatic capacitor C3 and a capacitance CA4 of the fourth electrostatic capacitor C4 are adjusted based on calibration data written into the calibration register 19, so that the offset in the output voltage Vout of the sensor circuit 30 (preferably the digital value after the AD conversion) becomes a desired value, preferably a minimum value.

As for the calibration of the sensor circuit 30 (Refer to FIG. 3), it is preferable that the capacitances CA1-CA4 of the first through fourth electrostatic capacitors C1-C4 are equal to each other (CA1=CA2=CA3=CA4=C) in the initial state.

However, when the capacitance CA1 of the first electrostatic capacitor C1 becomes larger than the capacitance CA2 of the second electrostatic capacitor C2 by ΔC (CA1=C+ΔC, CA2=C) due to the change in the environment, for example, there is caused the offset in the output voltage Vout. In this case, the offset can be reduced to the minimum value (0 V) by adjusting the capacitances CA3 and CA4 of the third and fourth electrostatic capacitors C3 and C4 so that the capacitance CA3 is larger than the capacitance CA4 by ΔC (CA3=C+ΔC, CA4=C).

When the capacitance CA1 of the first electrostatic capacitor C1 is smaller than the capacitance CA2 of the second electrostatic capacitor C2 by ΔC (CA1=C−ΔC, CA2=C), on the other hand, the capacitances CA3 and CA4 of the third and fourth electrostatic capacitors C3 and C4 are adjusted so that the capacitance CA3 is smaller than the capacitance CA4 by ΔC (CA3=C−ΔC, CA4=C).

Figure 4:
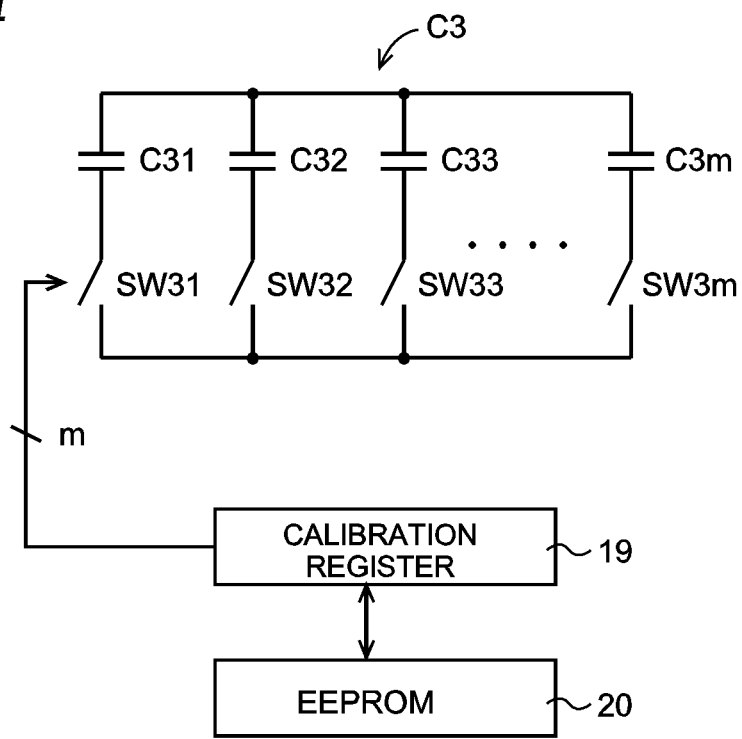
FIG. 4 shows a structure of a variable capacitor for calibration.

As an example structure of the third electrostatic capacitor C3 in this case, the third electrostatic capacitor C3 is formed to include m electrostatic capacitors C31-C3m and m switches S31-S3m, as shown in FIG. 4. It is preferable that capacitances CA31-CA3m of the electrostatic capacitors C31-C3m are weighted so that the capacitance CA3 of the third electrostatic capacitor C3 can be fine-adjusted. For example, when the capacitance CA31 of the capacitor C31 is denoted as C0, CA32=½ C0, CA33=¼ C0, CA34=⅛ C0, CA3m=½$^{m-1}$ C0. Each of the switches S31-S3m is turned on and off by corresponding each of m-bits of the calibration data from the calibration register 19. The same applies to the fourth electrostatic capacitor C4.

With the structure described above, the capacitances CA3 and CA4 of the third and fourth electrostatic capacitors C3 and C4 can be adjusted by the corresponding 2m-bits of the calibration data from the calibration register 19. The 2m-bits of the calibration data can be determined based on the output voltage Vout of the sensor circuit 30 so that the offset in the output voltage Vout becomes the desired value, that is preferably the minimum value. The determined calibration data is written into an electrically writable and erasable non-volatile memory such as the EEPROM 20, and stored in it.

Next, the operations of the sensor circuit 30 of the differential input type described above (Refer to FIG. 3) will be explained referring to FIG. 5A through FIG. 7. In this case, the alternating current drive signal SCDRV is a clock signal alternating between a high level (Vref) and a low level (ground voltage=0 V). A voltage difference between an output voltage Vom from the inverting output terminal (−) of the differential amplifier 14 and an output voltage Vop from the non-inverting output terminal (+) of the differential amplifier 14 is the output voltage Vout (=Vop−Vom).

The sensor circuit 30 has a charge accumulation mode and a charge transfer mode that alternate between each other.

Figure 5A:
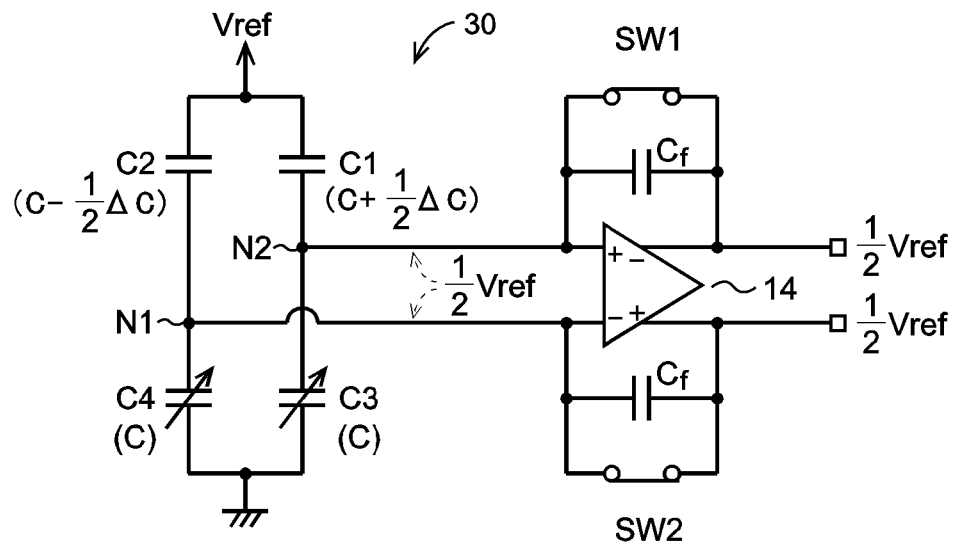
FIGS. 5A and 5B show operations of the sensor circuit.

First, when the sensor circuit 30 is in the charge accumulation mode, which is shown in FIG. 5A, Vref is applied to the first and second electrostatic capacitors C1 and C2. Also, the ground voltage (0 V) is applied to the third and fourth electrostatic capacitors C3 and C4.

The switches SW1 and SW2 are turned on. With this, the inverting output terminal (−) and the non-inverting input terminal (+) of the differential amplifier 14 are short-circuited, while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) are all set to ½ Vref. A common mode voltage of the differential amplifier 14 in this case is ½ Vref.

Figure 5B:
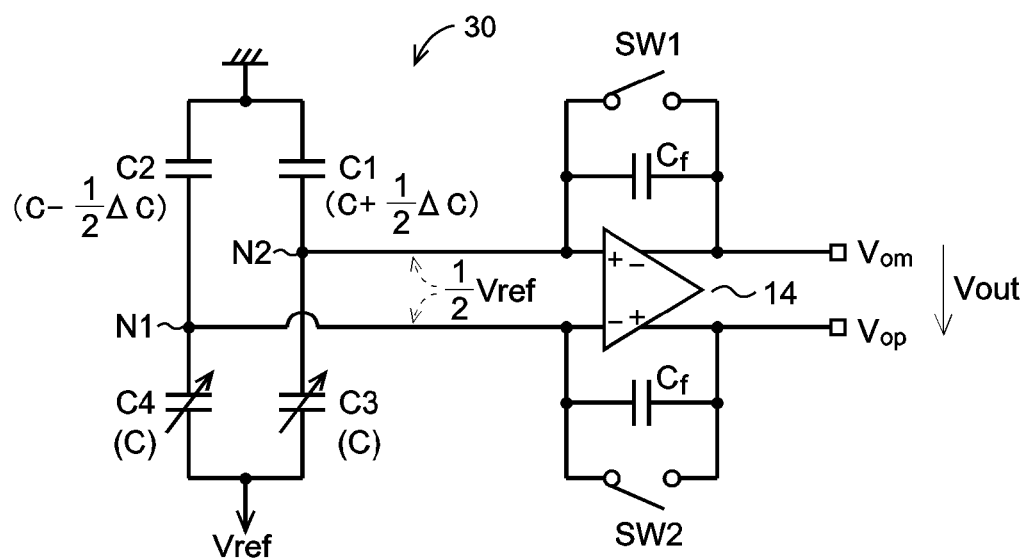

Next, when the sensor circuit 30 is in the charge transfer mode, which is shown in FIG. 5B, the ground voltage (0 V) is applied to the first and second electrostatic capacitors C1 and C2, to the contrary of the case in the charge accumulation mode. Also, Vref is applied to the third and fourth electrostatic capacitors C3 and C4. The switches SW1 and SW2 are turned off.

The capacitances CA1, CA2, CA3 and CA4 of the electrostatic capacitors C1, C2, C3 and C4 are equal to each other in the initial state (CA1=CA2=CA3=CA4=C). A difference between the capacitances CA1 and CA2 when the finger of operator approaches the touch pad is represented by ΔC (CA1−CA2=ΔC). In this case, CA1=C+½ ΔC, and CA2=C−½ ΔC.

In the charge accumulation mode shown in FIG. 5A, an amount of electric charges at the node N1 is given by the following equation:

$$\text{Amount of Electric Charges at } N1 = \left(C - \frac{1}{2}\Delta C\right) \cdot \left(-\frac{1}{2}Vref\right) + C \cdot \left(\frac{1}{2}Vref\right) + CAf \cdot 0 \quad [\text{Equation 1}]$$

where (C−½ΔC)·(−½ Vref) represents an amount of electric charges stored in C2, C·(½Vref) represents an amount of electric charges stored in C4 and CAf·0 (=0) represents an amount of electric charges stored in Cf.

In the charge transfer mode shown in FIG. 5B, an amount of electric charges at the node N1 is given by the following equation:

$$\text{Amount of Electric Charges at } N1 = \left(C - \frac{1}{2}\Delta C\right) \cdot \left(\frac{1}{2}Vref\right) + C \cdot \left(-\frac{1}{2}Vref\right) + CAf \cdot \left(Vop - \frac{1}{2}Vref\right) \quad [\text{Equation 2}]$$

where (C−½ ΔC)·(½Vref) represents an amount of electric charges stored in C2, C·(−½ Vref) represents an amount of electric charges stored in C4 and CAf·(Vop−½Vref) represents an amount of electric charges stored in Cf.

[Equation 1]=[Equation 2] holds, since the amount of electric charges at N1 in the charge accumulation mode is equal to the amount of electric charges at N1 in the charge transfer mode according to the law of conservation of electric charge.

Following equation is derived by solving [Equation 1]= [Equation 2] for Vop:

$$Vop = \left(1 + \frac{\Delta C}{CAf}\right) \cdot \frac{1}{2} Vref \qquad \text{[Equation 3]}$$

Similarly, following equation is derived by solving for Vom an equation obtained by applying the law of conservation of electric charge to an amount of electric charges at the node N2 in the charge accumulation mode and an amount of electric charges at the node N2 in the charge transfer mode:

$$Vom = \left(1 - \frac{\Delta C}{CAf}\right) \cdot \frac{1}{2} Vref \qquad \text{[Equation 4]}$$

Vout is obtained from [Equation 3] and [Equation 4]:

$$Vout = Vop - Vom = \frac{\Delta C}{CAf} \cdot Vref \qquad \text{[Equation 5]}$$

It is understood that the output voltage Vout of the sensor circuit 30 varies in proportion to the difference ΔC between the capacitance CA1 of the first electrostatic capacitor C1 and the capacitance CA2 of the second electrostatic capacitor C2.

It is assumed in the above calculations that CA1=CA2=CA3=CA4=C. When there is caused a difference between CA1 and CA2 due to the change in the environment or the like, the offset in the output voltage Vout can be made to a predetermined value or to the minimum value by adjusting CA3 and CA4 using the calibration register 19 as described above so that there is the same amount of difference between CA3 and CA4.

Figure 6:
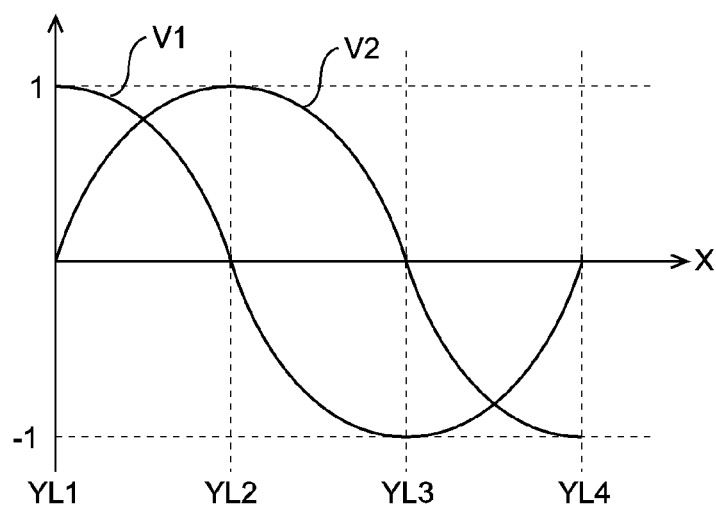
FIG. 6 shows output waveforms of the sensor circuit.

Next, characteristics of the output voltage Vout of the sensor circuit 30 used in the touch sensor are explained referring to Table 1 and FIG. 6. As described above, the selection circuit 10 has the first phase in which it selects the signals from the first input terminal CIN1 and the second input terminal CIN2 and the second phase in which it selects the signals from the third input terminal CIN3 and the fourth input terminal CIN4.

The output voltage Vout of the sensor circuit 30 in the first phase is denoted as V1, while the output voltage Vout of the sensor circuit 30 in the second phase is denoted as V2. In this case, the output voltage V1 is proportional to the difference between the capacitance of the capacitor formed between the Y sense line YL1 and the Y drive line DRYL and the capacitance of the capacitor formed between the Y sense line YL3 and the Y drive line DRYL.

Also, the output voltage V2 is proportional to the difference between a capacitance of a capacitor formed between the Y sense line YL2 and the Y drive line DRYL and a capacitance of a capacitor formed between the Y sense line YL4 and the Y drive line DRYL. Then, the finger of operator or the like makes a single-touch on the touch panel 1 in a range between the Y sense line YL1 and the Y sense line YL4.

TABLE 1

| | Mode | |
|---|---|---|
| | First Phase | Second Phase |
| Line | V1 | V2 |
| YL1 | +1 | 0 |
| YL2 | 0 | +1 |
| YL3 | −1 | 0 |
| YL4 | 0 | −1 |

First, when the finger of operator or the like touches the Y sense line YL1, the first output voltage V1 in the first phase becomes a positive (+) value. This is because the capacitance of the capacitor formed between the Y sense line YL1 and the Y drive line DRYL becomes larger than the capacitance of the capacitor formed between the Y sense line YL3 and the Y drive line DRYL. And the second output voltage V2 in the second phase becomes 0 V. This is because no change is caused in the capacitance related to the Y sense line YL2 or YL4, since the finger of operator or the like touches the Y sense line YL1 only.

Next, when the finger of operator or the like touches the Y sense line YL2, the first output voltage V1 in the first phase becomes 0 V. This is because no change is caused in the capacitance related to the Y sense line YL1 or YL3. On the other hand, the second output voltage V2 in the second phase becomes a positive (+) value. This is because the capacitance of the capacitor formed between the Y sense line YL2 and the Y drive line DRYL becomes larger than the capacitance of the capacitor formed between the Y sense line YL4 and the Y drive line DRYL.

Next, when the finger of operator or the like touches the Y sense line YL3, the first output voltage V1 in the first phase becomes a negative (−) value. This is because the capacitance of the capacitor formed between the Y sense line YL3 and the Y drive line DRYL becomes larger than the capacitance of the capacitor formed between the Y sense line YL1 and the Y drive line DRYL. On the other hand, the second output voltage V2 in the second phase becomes 0 V. This is because no change is caused in the capacitance related to the Y sense line YL2 or YL4, since the finger of operator or the like touches the Y sense line YL3 only.

Finally, when the finger of operator or the like touches the Y sense line YL4, the first output voltage V1 in the first phase becomes 0 V. This is because no change is caused in the capacitance related to the Y sense line YL1 or YL3. On the other hand, the second output voltage V2 in the second phase becomes a negative (−) value. This is because the capacitance of the capacitor formed between the Y sense line YL4 and the Y drive line DRYL becomes larger than the capacitance of the capacitor formed between the Y sense line YL2 and the Y drive line DRYL. Note that maximum absolute values of the first and second output voltages V1 and V2 are normalized to "1" in Table 1 and in FIG. 6.

Also, FIG. 6 shows that the first and second output voltages V1 and V2 vary continuously in accordance with the change in the touch position. That is, making a point on the Y line YL1 in FIG. 1 as an origin in FIG. 6 and making the X coordinate axis in FIG. 1 as a horizontal axis in FIG. 6, the first output voltage V1 is approximated by V1=cos X, and the second output voltage V2 is approximated by V2=sin X. Therefore, it is possible to detect the touch position (X coordinate) based on the first and second output voltages V1 and V2.

To show an example, since an equation V2/V1=tan X holds, the X coordinate of the touch position can be obtained using an equation X=arctan (V2/V1) and polarities (+, −) of the first and second output voltages V1 and V2. Here, arctan is an inverse function of tan. In this case, the first and second output voltages V1 and V2 are converted into digital values with the A/D converter 17 and transmitted to the microcomputer 3 through the I²C bus interface circuit 18 as described above. The X coordinate of the touch position can be obtained by performing the calculation described above with the microcomputer 3.

Figure 7:
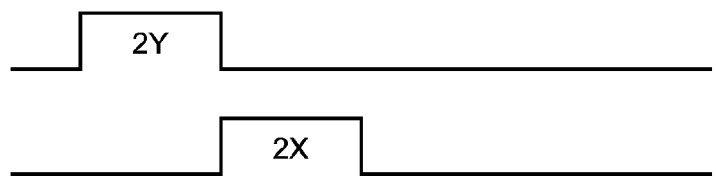
FIG. 7 is an operation timing chart of the electrostatic capacity type touch sensor.

Similarly, the Y coordinate of the touch position on the X sense lines XL1-XL4 can be detected based on the first and second output voltages V1 and V2 through the operations of the signal processing circuit 2X. The X and Y coordinates of the touch position can be obtained through time-series operations of the signal processing circuits 2X and 2Y as shown in FIG. 7, for example.

Figure 8:
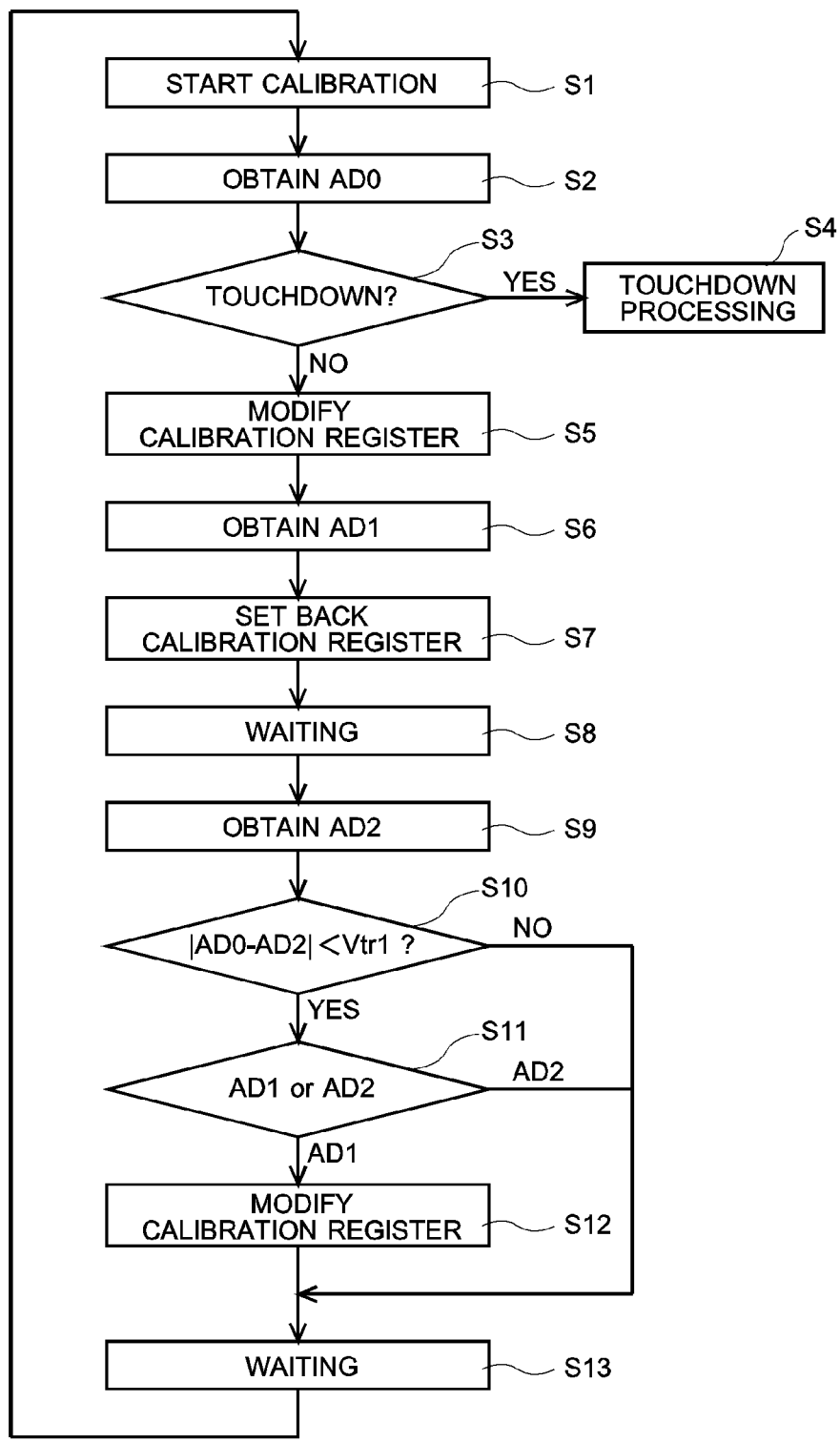
FIG. 8 is a flow chart showing a calibration control flow of the electrostatic capacity type touch sensor according to the embodiment of this invention.

Next, the calibration control of the electrostatic capacity type touch sensor 100 is explained referring to FIG. 8. The calibration control is directed to reducing the time for calibration as well as performing the calibration corresponding to the change in the environment at a moment when the finger of operator or the like does not touch the sense line (Y sense line YL1, for example), and is carried out according to the program stored in the microcomputer 3 as described above.

First, in step S1, the electrostatic capacity type touch sensor 100 goes into a calibration mode based on a start command from the microcomputer 3.

Next, in step S2, the sensor circuit 30 is put into operation based on 2m-bits of first calibration data X0 (initial setting, or current setting) stored in the calibration register 19, and a first output voltage AD0 (an example of "first output value of the electrostatic capacity type touch sensor" of this invention, and a digital value of the output voltage Vout of the sensor circuit 30 after the AD conversion) is obtained.

Next, in step S3, the microcomputer 3 judges whether the first output voltage AD0 is larger than a predetermined touchdown threshold value. When the first output voltage AD0 is larger than the touchdown threshold value, it is regarded as the sense line (X sense line XL1, for example) has been touched, and touchdown processing is carried out (step S4).

The touchdown processing means manipulating electronic equipment in which the electrostatic capacity type touch sensor 100 is used as an input device (turning on/off or changing the channel of TV, for example). When the first output voltage AD0 is smaller than the touchdown threshold value, on the other hand, it is regarded as there has been no touchdown, and followed by the calibration as described below.

Next, in step S5, the first calibration data X0 in the calibration register 19 is modified into second calibration data X1 based on the first output voltage AD0. In this case, the second calibration data X1 is determined through calculation by the microcomputer 3 so that the first output voltage AD0 of the sensor circuit 30 approaches the center value (0 V in this embodiment, since the sensor circuit 30 is capable of outputting positive and negative voltages around its center value of 0 V) of the output voltage Vout of the sensor circuit 30.

In this case, assuming that the change in the output voltage Vout of the sensor circuit 30 due to the change in the environment is not steep, it is preferable for reducing the calibration time that the modification on the first calibration data X0 is a minimum modification, which is increasing by 1 or reducing by 1.

Next, in step S6, the sensor circuit 30 is put into operation based on the modified second calibration data X1 and under modified capacitance balance, and a second output voltage AD1 (an example of "second output value of the electrostatic capacity type touch sensor" of this invention, and a digital value of the output voltage Vout of the sensor circuit 30 after the AD conversion) is obtained.

Next, in step S7, the data in the calibration register 19 is set back to the first calibration data X0. This is made because validity of the second calibration data X1 has not been confirmed yet.

Next, in step S8, there is waiting for a predetermined period of time T1. This is effective to find out whether the change in the output voltage Vout of the sensor circuit 30 is due to the change in the environment or not, and is based on experimental finding that the change in the output voltage Vout of the sensor circuit 30 during the predetermined period of time T1 is not steep when the change in the output voltage Vout of the sensor circuit 30 is due to the change in the environment. The predetermined period of time T1 can be set by a counter incorporated in the microcomputer 3.

Next, in step S9, the sensor circuit 30 is put into operation again after the predetermined period of time T1 under capacitance balance based on the original first calibration data X0, and a third output voltage AD2 (an example of "third output value of the electrostatic capacity type touch sensor" of this invention, and a digital value of the output voltage Vout of the sensor circuit 30 after the AD conversion) is obtained.

Next, in step S10, whether the first output voltage AD0 and the third output voltage AD2 are very close to each other is judged. For that purpose, an absolute value of a difference (AD0−AD2) between the first output voltage AD0 and the third output voltage AD2 is compared with a first threshold value Vtr1. When the absolute value of the difference (AD0−AD2) between the output voltages is smaller than the first threshold value Vtr1, it is regarded as there has been no steep change in the output voltage Vout of the sensor circuit 30 during the waiting time, that is, the finger of operator or the like has not touched the sense line.

When the absolute value of the difference (AD0−AD2) between the output voltages is larger than the first threshold value Vtr1, on the other hand, it is regarded as there has been a steep change in the output voltage Vout of the sensor circuit 30 during the waiting time, that is, the finger of operator or the like has touched the sense line, and modifying the data in the calibration register 19 is not permitted. That is, the data in the calibration register 19 is retained to be the first calibration data X0.

In this case, it is preferable that the first threshold value Vtr1 is 1/10 of the maximum value of the output voltage Vout of the sensor circuit 30, that is, the output voltage Vout at the time when the finger of operator or the like touches the sense line. The maximum value of the output voltage Vout of the sensor circuit 30 in this case is the maximum value of each of the first and second output voltages V1 and V2 shown in FIG. 6, for example. When the absolute value of the difference (AD0−AD2) between the output voltages is equal to or smaller than the first threshold value Vtr1 described above, the difference (AD0−AD2) between the output voltages can be empirically judged to be due to the change in the environment.

When it is judged in the step S10 that the finger of operator or the like has not touched, the proceedings advance to next step S11 in which the second output voltage AD1 and the third output voltage AD2 are compared with each other to judge which is more suitable. To describe more specifically, which of the second output voltage AD1 and the third output voltage AD2 has smaller offset (difference between the sensor output value and the center value (0 V) of the output voltage Vout of the sensor circuit 30) is judged.

When the offset in the second output voltage AD1 is smaller than the offset in the third output voltage AD2, the modification to the second calibration data X1 is permitted and the data in the calibration register 19 is modified to the second calibration data X1 in step S12.

When the offset in the third output voltage AD2 is smaller than the offset in the second output voltage AD1, the modification to the second calibration data X1 is not permitted. That is, the data in the calibration register 19 is retained to be the first calibration data X0.

Although the second output voltage AD1 is compared with the third output voltage AD2 in the step S11 as described above, it is also possible that the first output voltage AD0 is compared with the second output voltage AD1. However, comparing the second output voltage AD1 with the third output voltage AD2 is preferable. Because while the first output voltage AD0 and the third output voltage AD2 are based on the same calibration data X0, the third output voltage AD2 reflects the environment in which the electrostatic capacity type touch sensor 100 is currently placed more appropriately than the first output voltage AD0.

Again, there is waiting for a predetermined period of time T2 in subsequent step S13. After that, the proceedings return to the step S1, and the calibration control flow described above is carried out again when the start command is outputted from the microcomputer 3.

With the electrostatic capacity type touch sensor 100 according to the embodiment of this invention, the calibration time can be substantially reduced compared with the case in which the offset is adjusted by increasing or decreasing the calibration data step by step from an initial data (all bits are zero, for example), since the second calibration data X1 is obtained by fine-adjusting the first calibration data X0 by about ±1 based on the first output voltage AD0 of the sensor circuit 30 obtained in most recent measurement, before making measurement again.

Also, whether the finger of operator or the like touches the sense line (touch pad) is accurately judged based on the comparison between the first output voltage AD0 and the third output voltage AD2, and the calibration corresponding to the change in the environment can be carried out.

In order to more accurately judge whether the output voltage difference (AD0–AD2) between the first output voltage AD0 and the third output voltage AD2 is due to the change in the environment, it is preferable that another judgment criteria of a gradient of the output value of the sensor circuit 30, that is a rate of change, is added to the judgment criteria in the step 10.

That is, when the absolute value of the output voltage difference (AD0–AD2) is equal to or smaller than the first threshold value Vtr1, and the gradient of the absolute value of the output voltage difference (AD0–AD2), that is, a quotient obtained by dividing the absolute value of the output voltage difference (AD0–AD2) by the waiting time T1 is smaller than a second threshold value, it is judged that the output voltage difference (AD0–AD2) is due to the change in the environment.

Figure 9A:
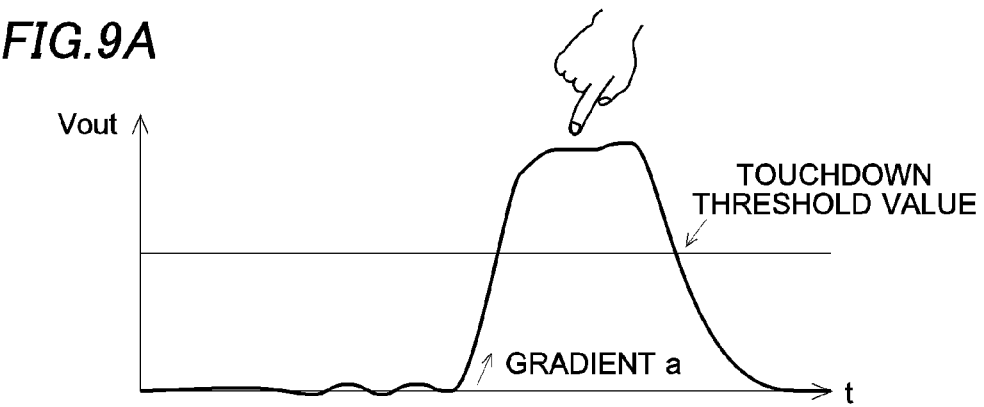
FIGS. 9A, 9B and 9C show output waveforms of the electrostatic capacity type touch sensor according to the embodiment of this invention.
Figure 9B:
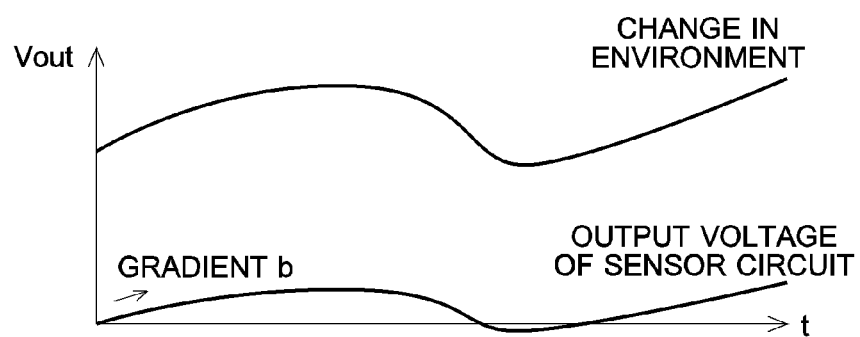
Figure 9C:
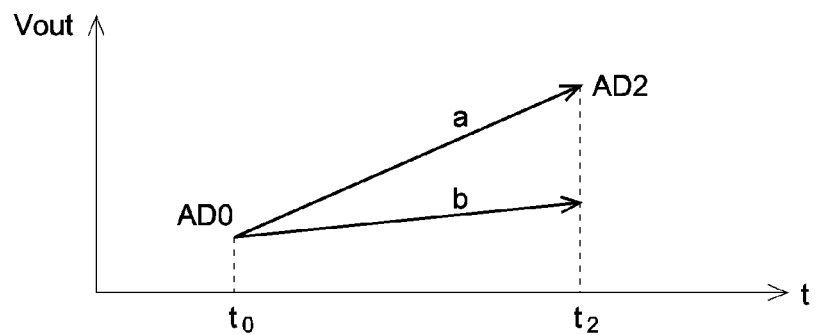

As shown in FIGS. 9A, 9B and 9C, the judgment is based on experimental data taken by the inventors (Refer to FIG. 9C) which shows that a gradient b (gradient b in FIG. 9B) of the output voltage Vout of the sensor circuit 30 due to the change in the environment is much smaller than a gradient a (gradient a in FIG. 9A) of the output voltage Vout of the sensor circuit 30 when the finger of operator or the like touches the sense line.

Figure 10:
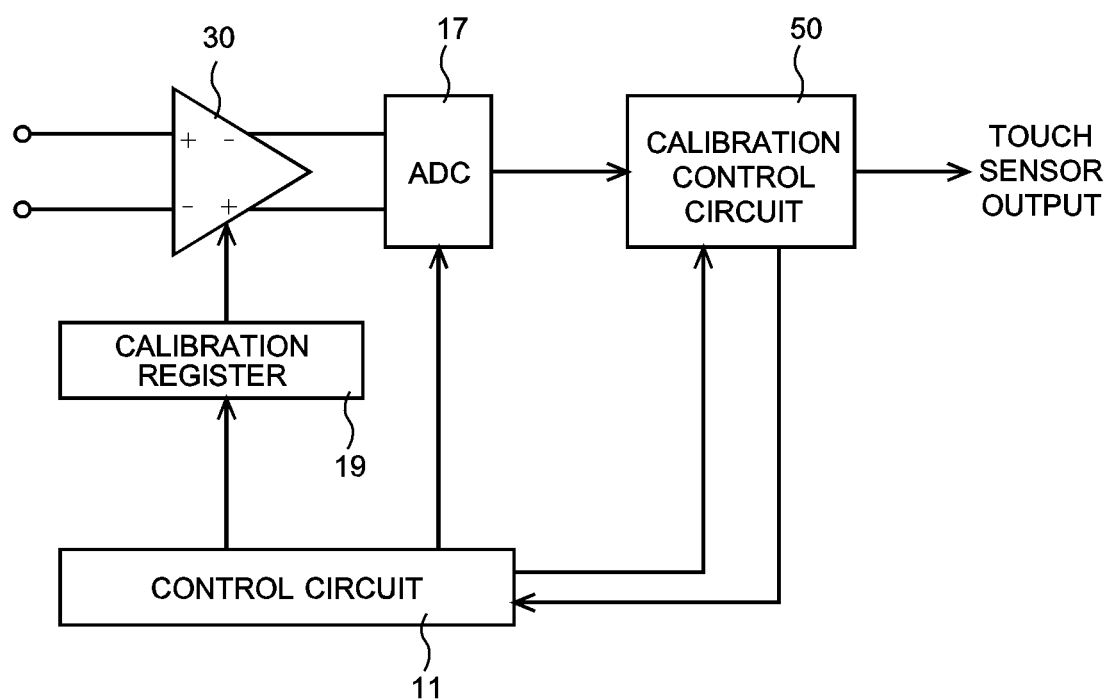
FIG. 10 shows a structure of a signal processing circuit of the electrostatic capacity type touch sensor according to the embodiment of this invention.
Figure 11:
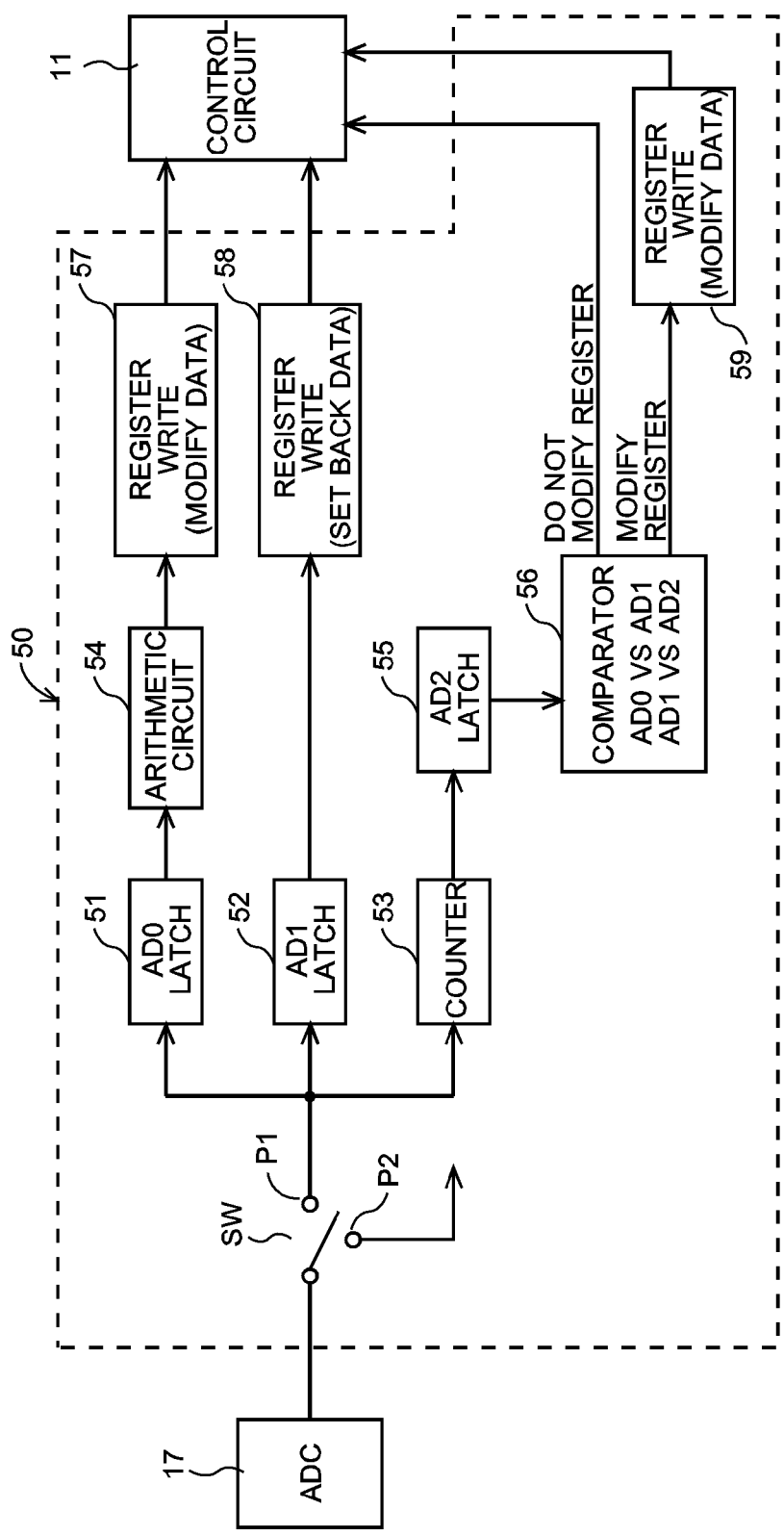
FIG. 11 shows a structure of a calibration control circuit.

Although the calibration control described above is executed by the microcomputer 3, the software functions of the microcomputer 3 can be also realized with hardware that is a calibration control circuit 50, as shown in FIG. 10. The calibration control circuit 50 is formed to include a switch SW, an AD0 latch circuit 51, an AD1 latch circuit 52, a counter 53, an arithmetic circuit 54, an AD2 latch circuit 55, a comparator 56, and register write circuits 57, 58 and 59, as shown in FIG. 11. The calibration control circuit 50 may be incorporated in the signal processing circuits 2X and 2Y.

The calibration control circuit 50 is structured corresponding to the calibration control flow shown in FIG. 8. The switch SW outputs the output of the AD converter 17 to either a terminal P1 or a terminal P2. When the calibration control is to be carried out, the switch SW applies the output of the AD converter 17 to the terminal P1. The calibration control circuit 50 is configured to be put into operation based on the output of the AD converter 17.

When the calibration control is not to be carried out, on the other hand, the switch SW applies the output of the AD converter 17 to the terminal P2. In this case, the output of the AD converter 17 is outputted without going through the calibration control circuit 50.

Each of the AD0 latch circuit 51, the AD1 latch circuit 52 and the AD2 latch circuit 55 latches each of the first through third output voltages AD0-AD2, respectively. The arithmetic circuit 54 calculates the second calibration data X1 based on the first output voltage AD0 stored in the AD0 latch circuit 51.

The register write circuit 57 corresponds to the step S5, and writes the second calibration data X1 into the calibration register 19. As a result, the data in the calibration register 19 is modified to the second calibration data X1.

The register write circuit 58 corresponds to the step S7, and writes the first calibration data X0 into the calibration register 19 when the second output voltage AD1 is latched in the AD1 latch circuit 52. As a result, the data in the calibration register 19 is set back to the first calibration data X0. The counter 53 corresponds to the step S8, and counts the predetermined period of time T1.

The comparator 56 corresponds to the step S10, and compares the absolute value of the difference (AD0–AD2) between the first output voltage AD0 and the third output voltage AD2 with the first threshold value Vtr1. The comparator 56 also corresponds to the step S11, and compares the offset in the second output voltage AD1 with the offset in the third output voltage AD2.

The register write circuit 59 corresponds to the step S12, and writes the second calibration data X1 into the calibration register 19. As a result, the data in the calibration register 19 is modified to the second calibration data X1.

It is apparent that this invention is not limited to the embodiments described above, and may be modified within the scope of the invention. For example, the touch panel 1 is formed using the sense lines. Not limited to the above, the touch panel 1 may be formed of touch pads, each of which makes a capacitor that varies its capacitance when touched by the finger of operator or the like. Also, the sensor circuit 30 is formed of the differential type circuit that detects the difference in the capacitances of a pair of sense lines. Not limited to the above, the sensor circuit 30 may be formed of a single type circuit that directly detects a change in a capacitance of a single sense line (or a touch pad).

With the electrostatic capacity type touch sensor according to the embodiment of this invention, the calibration time can be reduced, while it is made possible that the calibration corresponding to the change in the environment is carried out at the moment when the finger of operator or the like does not touch the touch pad.

What is claimed is:

1. An electrostatic capacity type touch sensor comprising:
a sensor circuit detecting a change in a capacitance of a touch pad;
a calibration register to adjust an offset in an output value of the sensor circuit; and
a control circuit configured to:
control the sensor circuit to obtain a first output value of the electrostatic capacity type touch sensor based on first calibration data stored in the calibration register,
modify the first calibration data depending on the first output value to obtain second calibration data,
control the sensor circuit to obtain a second output value of the electrostatic capacity type touch sensor based on the second calibration data,
after obtaining the second output value, control the sensor circuit to obtain a third output value of the electrostatic capacity type touch sensor based on the first calibration data, and
judge whether an offset in the second output value is larger than an offset in the third output value when a difference between the first output value and the third output value is smaller than a first threshold value, the offset in the second output value being a difference between a reference value and the second output value, and the offset in the third output value being a difference between the reference value and the third output value.

2. The electrostatic capacity type touch sensor of claim 1, wherein the control circuit permits the modification of the first calibration data when the offset in the second output value is smaller than the offset in the third output value, but does not permit the modification of the first calibration data when the offset in the third output value is smaller than the offset in the second output value.

3. The electrostatic capacity type touch sensor of claim 1, wherein the control circuit judges whether the offset in the second output value is smaller than the offset in the third output value when the difference between the first output value and the third output value is smaller than the first threshold value and a rate of change in an output value of the sensor circuit is smaller than a second threshold value.

4. The electrostatic capacity type touch sensor of claim 1, wherein the first threshold value is one tenth of a maximum output value of the sensor circuit.

5. The electrostatic capacity type touch sensor of claim 1, wherein the control circuit does not permit the modification of the first calibration data when the difference between the first output value and the third output value is larger than the first threshold value.

* * * * *